(12) United States Patent
Matsubara et al.

(10) Patent No.: US 7,717,573 B2
(45) Date of Patent: May 18, 2010

(54) PROJECTION DISPLAY APPARATUS

(75) Inventors: Masateru Matsubara, Tokyo (JP); Eiki Matsuo, Nagano (JP)

(73) Assignee: NEC Viewtechnology, Ltd., Minato-ku, Tokyo (JP)

( * ) Notice: Subject to any disclaimer, the term of this patent is extended or adjusted under 35 U.S.C. 154(b) by 841 days.

(21) Appl. No.: 11/395,356

(22) Filed: Apr. 3, 2006

(65) Prior Publication Data
US 2006/0227303 A1  Oct. 12, 2006

(30) Foreign Application Priority Data
Apr. 11, 2005  (JP) .............. 2005-113613

(51) Int. Cl.
*G03B 21/28* (2006.01)
(52) U.S. Cl. .............. 353/99; 353/78; 353/79
(58) Field of Classification Search .......... 353/74, 353/77, 78, 79, 98, 99
See application file for complete search history.

(56) References Cited

U.S. PATENT DOCUMENTS

| | | | |
|---|---|---|---|
| 5,315,629 A | 5/1994 | Jewell et al. | |
| 6,513,935 B2 * | 2/2003 | Ogawa | 353/37 |
| 6,752,500 B1 * | 6/2004 | Yoshii et al. | 353/78 |
| 6,779,897 B2 * | 8/2004 | Konno et al. | 353/99 |
| 6,822,811 B2 | 11/2004 | Ishihara | |
| 6,994,437 B2 * | 2/2006 | Suzuki et al. | 353/77 |
| 7,239,452 B2 * | 7/2007 | Kuwa | 359/649 |
| 7,341,357 B2 * | 3/2008 | Furuichi et al. | 359/862 |
| 2003/0206353 A1 | 11/2003 | Ishihara | |
| 2006/0126032 A1 * | 6/2006 | Takaura et al. | 353/99 |
| 2006/0164605 A1 * | 7/2006 | Kuwa | 353/78 |
| 2006/0192902 A1 * | 8/2006 | Sawai et al. | 349/5 |
| 2008/0068564 A1 * | 3/2008 | Abe et al. | 353/98 |

FOREIGN PATENT DOCUMENTS

| | | |
|---|---|---|
| EP | 1 205 791 A1 | 5/2002 |
| JP | 2-79037 | 3/1990 |
| JP | 10-111458 | 4/1998 |
| JP | 2003-121783 | 4/2003 |
| JP | 2003-161885 | 6/2003 |

(Continued)

OTHER PUBLICATIONS

Japanese Office Action dated Feb. 13, 2008 with partial English translation.

(Continued)

*Primary Examiner*—William C Dowling
(74) *Attorney, Agent, or Firm*—McGinn IP Law Group, PLLC

(57) ABSTRACT

A projection display apparatus has a light source, an image forming device for modulating light emitted from the light source with an image signal supplied thereto, and a reflective optical system for magnifying and projecting an image generated by the image forming device. The reflective optical system has a first reflecting mirror for reflecting light emitted from the image forming device and initially applied thereto, and a plurality of reflecting mirrors for successively reflecting the light reflected by the first reflecting mirror. The first reflecting mirror has a spherical reflecting surface, and a normal line passing through the crest of the spherical reflecting surface and a normal line passing through the image forming device extend nonparallel to each other.

16 Claims, 11 Drawing Sheets

FOREIGN PATENT DOCUMENTS

| | | |
|---|---|---|
| JP | 2003-177320 | 6/2003 |
| JP | 2003-287682 | 10/2003 |
| JP | 2004-45894 | 2/2004 |
| JP | 2004-144914 | 5/2004 |
| JP | 2004-157560 | 6/2004 |
| WO | 01/06295 | 1/2001 |
| WO | WO 01/11425 | 2/2001 |

OTHER PUBLICATIONS

Japanese Office Action dated Nov. 14, 2007 with partial English translation.
Japanese Office Action dated May 29, 2008 with Previously English Translation.
European Search Report Dated Jun. 2, 2006.
Chinese Office Action dated May 11, 2007, with English translation.

* cited by examiner

PRIOR ART

PROJECTION DISPLAY APPARATUS

BACKGROUND OF THE INVENTION

1. Field of the Invention

The present invention relates to a projection display apparatus for magnifying and projecting an image formed by an image forming device onto a projection surface such as a screen or the like.

2. Description of the Related Art

FIG. 1 of the accompanying drawings is a schematic side elevational view of an imaging optical system disclosed in JP-A No. 10-111458. As shown in FIG. 1, the disclosed imaging optical system is a reflective imaging optical system comprising three reflecting mirrors, i.e., first, second, and third reflecting mirrors, 101, 102, 103. The image forming device 100 shown in FIG. 1 is disposed on an imaging surface. Image forming device 100 emits light beams representing an image, which are successively reflected by first reflecting mirror 101, second reflecting mirror 102, and third reflecting mirror 103. The reflected light beams are then projected obliquely upwardly onto the reverse surface of a screen (not shown). The reflective imaging optical system disclosed in JP-A No. 10-111458 is will be reduced in size and, in particular, have a profile with reduced thickness, because the paths of the light beams emitted from image forming device 100 are folded back on themselves a plurality of times by the plurality reflecting mirrors.

The light beams (image) emitted from image forming device 100 are progressively magnified as they are reflected successively by first reflecting mirror 101, second reflecting mirror 102, and third reflecting mirror 103. If first reflecting mirror 101 to which the light beams emitted from image forming device 100 are first applied has a distortion or a deformation, the effects of distortion or deformation are also progressively magnified. Therefore, the reflecting surface of first reflecting mirror 101 is required to have a higher level of surface shape accuracy than the reflecting surfaces of second reflecting mirror 102 and third reflecting mirror 103. In addition, first reflecting mirror 101 is highly affected by heat from image forming device 100 because first reflecting mirror 101 is closest to image forming device 100. It is desirable that first reflecting mirror 101 be made of a material having a low linear coefficient of expansion.

For the above reasons, first reflecting mirror 101 of the reflective imaging optical system disclosed in JP-A No. 10-111458 has a spherical reflecting surface. The spherical reflecting surface can be finished to high accuracy by a less costly polishing process even if first reflecting mirror 101 is made of a glass material having a low linear coefficient of expansion.

The paths of the light beams extending from image forming device 100 to the screen have different lengths, respectively, which are responsible for an aberration (trapezoidal distortion) on the screen. In the reflective imaging optical system disclosed in JP-A No. 10-111458, second reflecting mirror 102 and third reflecting mirror 103 have an aberration correcting function. Specifically, each of second reflecting mirror 102 and third reflecting mirror 103 has an aspherical reflecting surface which satisfies given conditions.

The pamphlet of International Publication WO01/011425 discloses a reflective imaging optical system with an enhanced aberration correcting function. Structural details of the reflective imaging optical system disclosed in the pamphlet are shown in FIG. 2 of the accompanying drawings. As shown in FIG. 2, the reflective imaging optical system has optical engine (corresponding to image forming device 101 shown in FIG. 1) 200, first reflecting mirror (corresponding to first reflecting mirror 101 shown in FIG. 1) 201, and assistive lens 202 for assisting in aberration correction, which is disposed between optical engine 200 and first reflecting mirror 201. The reflective imaging optical system also has curved mirror 203 disposed closely above optical engine 200, and two other reflecting mirrors. Therefore, the reflective imaging optical system comprises four reflecting mirrors and a single lens. Curved mirror 203 serves as a mirror for avoiding interference between light beams reflected by first reflecting mirror 201 and optical engine 200.

As described above, in the field of reflective optical systems (or reflective imaging optical systems) for magnifying and projecting an image formed by an image forming device, aberrations caused by different optical path lengths are mainly corrected by the surface shapes of reflecting mirrors of the optical systems. Specifically, the shape of a reflecting surface is optimized to enhance the aberration correcting function. However, although the reflecting mirror to which the light beams emitted from the image forming device are first applied should preferably have a spherical reflecting surface, the aberration correcting function of the spherical reflecting surface is low. As a consequence, the reflecting mirrors at subsequent stages undergo an increased corrective capability burden. To solve for such an increased corrective capability burden, it is necessary to increase the number of reflecting mirrors used or to increase the latitude as to the corrective capability of each of the reflecting mirrors.

Increasing the number of reflecting mirrors, however, invites an increase in the cost and size of the reflective imaging optical system. The reflective imaging optical system is highly advantageous in that it is small in size because the paths of light beams are folded back on themselves a plurality of times by a plurality of reflecting mirrors. If the number of reflecting mirrors is increased, then the reflective imaging optical system necessarily becomes large in size, thus canceling the above advantage. The assistive lens that is inserted in the optical path as disclosed in the pamphlet referred to above also increases the number of optical elements, making the reflective imaging optical system large in size.

For increasing the latitude of the corrective capability of each reflecting mirror, the reflecting mirror needs to have an aspherical reflecting surface or a free-form reflecting surface. If, however, the reflecting surface of each reflecting mirror is complex in shape, then it becomes more difficult and costly to design and to fabricate the reflecting mirror. Furthermore, not only the accuracy of a reflecting surface shape, but also the accuracy of a three-dimensional positional relationship of the reflecting mirrors, i.e., the layout accuracy, affects the aberrational correction. Stated otherwise, no aberration can be corrected if the layout accuracy of each reflecting mirror is low even though each reflecting mirror has an ideal reflecting surface shape. For increasing the layout accuracy of each reflecting mirror, the reflective imaging optical system must have reference points or reference surfaces therein. However, if all the reflecting mirrors of the reflective imaging optical system have an aspherical reflecting surface or a free-form reflecting surface, then it is difficult to provide highly accurate reference points or reference surfaces in the reflective imaging optical system.

SUMMARY OF THE INVENTION

It is an object of the present invention to provide a projection display apparatus having an image forming device which is inclined to reduce the differences between optical path lengths of a plurality of light beams emitted from the image forming device, for thereby reducing a corrective capability burden on each of the reflecting mirrors incorporated in the projection display apparatus.

Another object of the present invention is to provide a projection display apparatus having an image forming device which is inclined to provide sufficient clearances between a plurality of reflecting mirrors incorporated in the projection display apparatus and optical paths which are folded back on themselves by the reflecting mirrors.

The above and other objects, features, and advantages of the present invention will become apparent from the following description with reference to the accompanying drawings which illustrate examples of the present invention.

DESCRIPTION OF THE PREFERRED EMBODIMENTS

1st Embodiment

Figure 1:
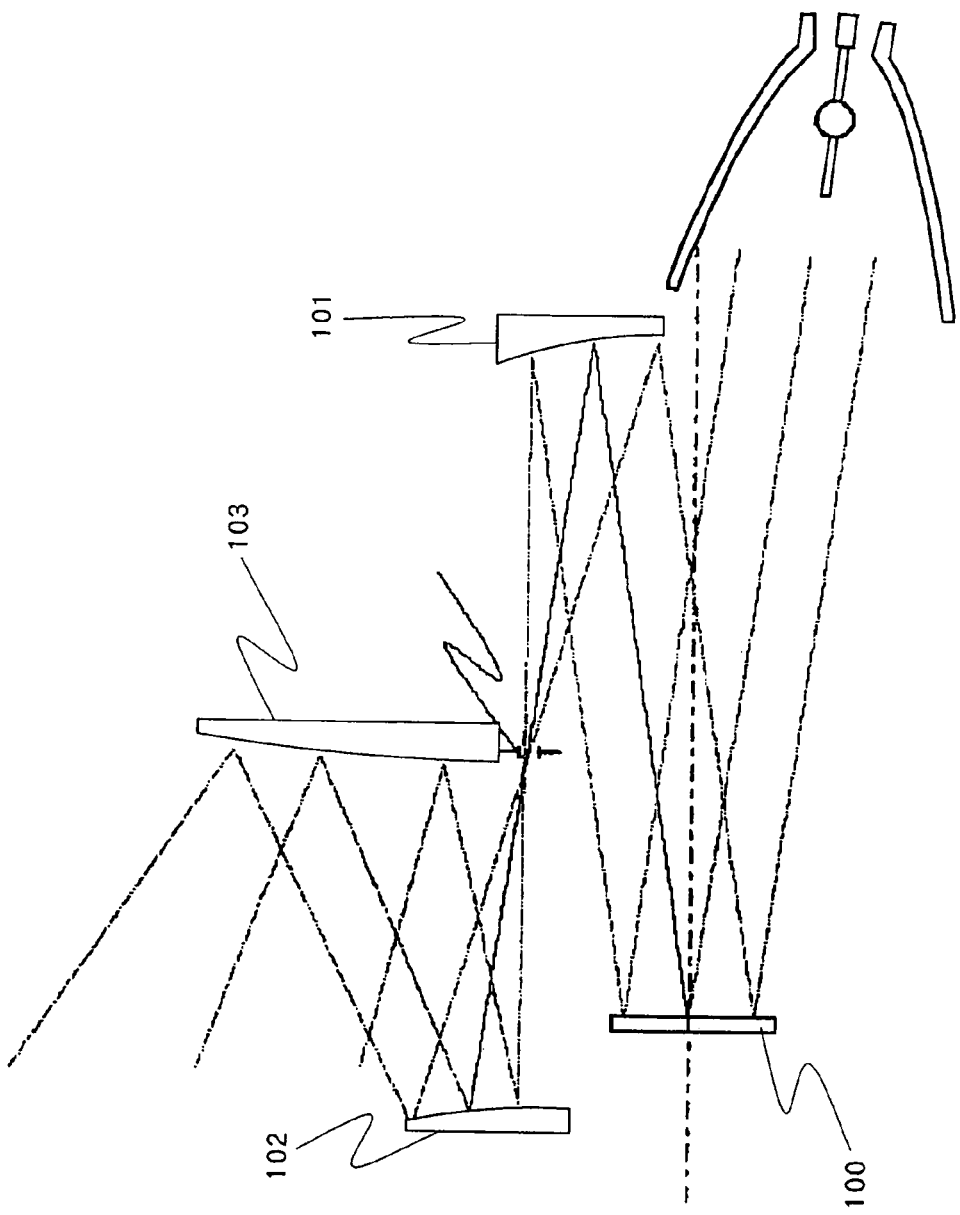
FIG. 1 is a schematic side elevational view of an imaging optical system disclosed in JP-A No. 10-111458.
Figure 2:
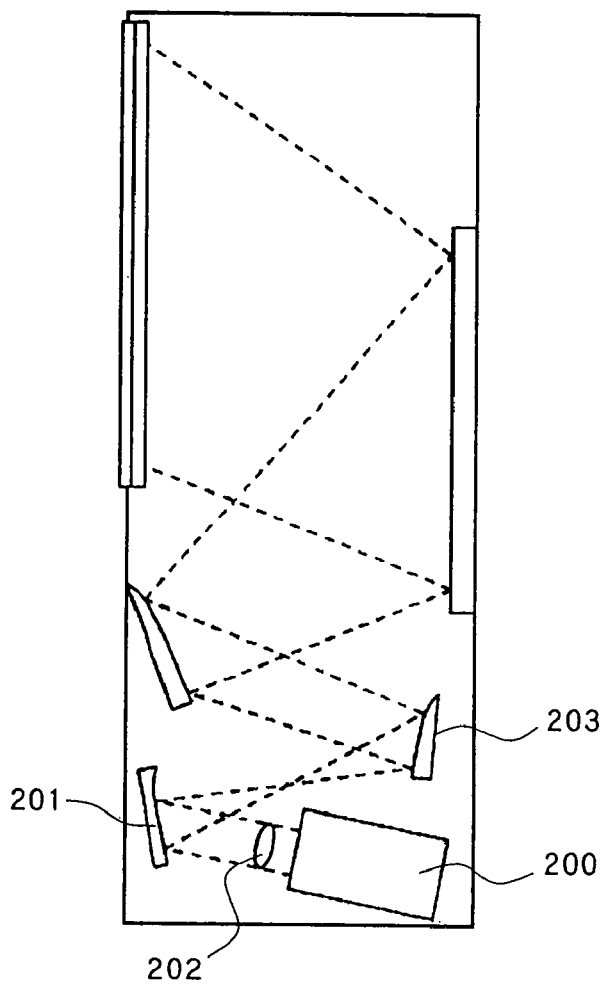
FIG. 2 is a schematic side elevational view of an imaging optical system disclosed in the pamphlet of International Publication WO01/011425.
Figure 3:
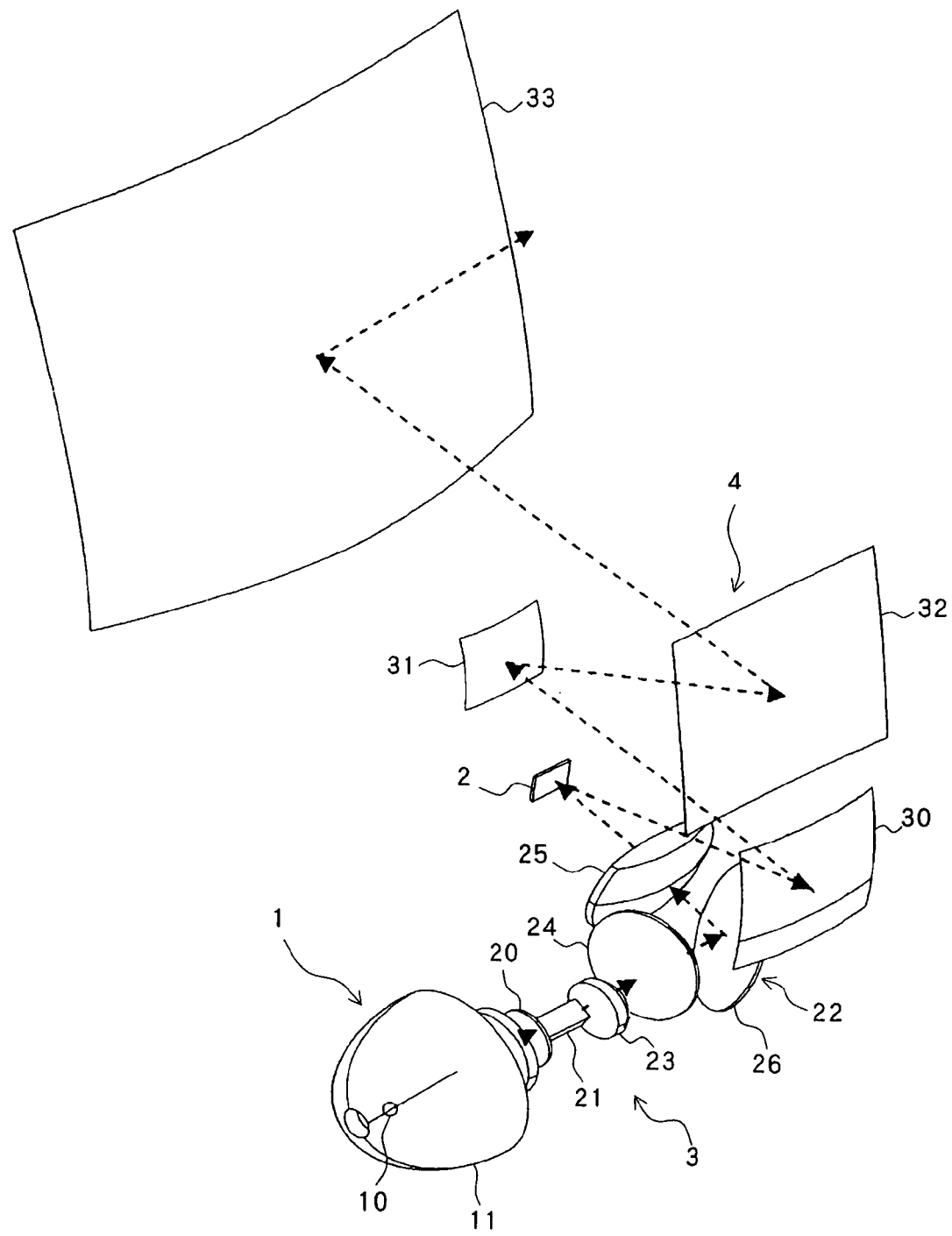
FIG. 3 is a schematic perspective view of an internal structure of a projection display apparatus according to a first embodiment of the present invention.

FIG. 3 shows in schematic perspective an internal structure of a projection display apparatus according to a first embodiment of the present invention. As shown in FIG. 3, the projection display apparatus according to the first embodiment has light source unit 1, image forming device 2, illumination optical system 3, and reflective optical system (imaging optical system) 4. Illumination optical system 3 guides light emitted from light source unit 1 toward image forming device 2. Image optical system 4 magnifies and projects an image formed by image forming device 2 onto a projection surface such as a screen or the like, not shown. Light source unit 1, image forming device 2, illumination optical system 3, and Image optical system 4 will be described, successively in the order named, in detail below.

Light source unit 1 has light source 10 and reflector 11. Light source 10 comprises a high-pressure discharge lamp (arc lamp) such as a metal halide lamp, a xenon lamp, a high-pressure mercury lamp or the like. Alternatively, light source 10 may comprise a lamp other than the arc lamps.

Reflector 11 collects light which has been emitted in all directions from light source 10. Specifically, reflector 11 has a spheroidal reflecting surface with a first focal point and a second focal point. Light source 10 is disposed at the first focal point. Light which has been emitted in all directions from light source 10 is focused by reflector 11 to the second focal point of reflector 11.

Illumination optical system 3 comprises color wheel 20, rod lens 21, and relay optical system 22. Color filter 20 separates the light collected by reflector 11 into different colors in a time-division manner. Rod lens 21 makes uniform a luminance distribution of light (color light) that has passed through color wheel 20. Relay optical system 22 changes the optical path of light that has passed through rod lens 21 and guides the light toward image forming device 2.

Color wheel 20 has a plurality of color filters of different transmission characteristics. Specifically, color wheel 20 has a red filter, a green filter, and a blue filter which are successively arranged in the circumferential direction of a circular base. The red filter passes only light belonging to a red wavelength band. The green filter passes only light belonging to a green wavelength band. The blue filter passes only light belonging to a blue wavelength band. Color wheel 20 is disposed in a position which is closer to light source 10 than the second focal point of reflector 11. When color wheel 20 rotates about its own axis, the color filters thereof successively move across the optical path of light traveling toward the second focal point of reflector 11. Before the light emitted from light source 10 is focused to the second focal point of reflector 11, the light is separated by color wheel 20 into red light (R), green light (G), and blue light (B) in a time-division fashion. Color wheel 20 may have an additional color filter for producing color light other than R, G, B from the light emitted from light source 10. For example, if color wheel 20 has an additional yellow filter for passing only light belonging to a yellow wavelength band, then the light emitted from light source 10 separated by color wheel 20 into red light (R), green light (G), yellow light (Ye), and blue light (B) in a time-division fashion.

Rod lens 21 comprises a prismatic optical glass member having an entrance end face and an opposite exit end face. Rod lens 21 is disposed such that the entrance end face thereof is positioned at the second focal point of reflector 11. The light emitted from light source 10 is separated into colors by color wheel 20 and then applied to the entrance end face of rod lens 21. The light applied to the entrance end face of rod lens 21 travels toward the exit end face thereof while being totally reflected in rod lens 21. While the light is traveling through rod lens 21, the luminance distribution thereof in a cross-sectional plane perpendicular to the optical axis is made uniform.

Relay optical system 22 comprises three lenses 23, 24, 25, and plane mirror 26 disposed between lenses 24, 25. Light emitted from the exit end face of rod lens 21 is converted into parallel light by lenses 23, 24, and then applied to plane mirror 26. Plane mirror 26 deflects the applied light through about 90° and applies the deflected light to lens 25. The light applied to lens 25 is converged thereby and irradiates image forming device 2.

Image forming device 2 will be described below. Image forming device 2 comprises a semiconductor device having more than several hundred thousand microscopic mirrors that are individually controlled based on an image signal applied from an external circuit to image forming device 2. The semiconductor device is generally referred to as DMD (Digital Micro-mirror Device). Specifically, each of the microscopic mirrors is tiltable in an angular range of ±12 degrees based on an image signal. Light reflected by a microscopic mirror which is tilted −12 degrees is absorbed by a light absorbing plate, not shown, and light reflected by a microscopic mirror which is tilted +12 degrees is applied to imaging optical system 4.

Figure 4:
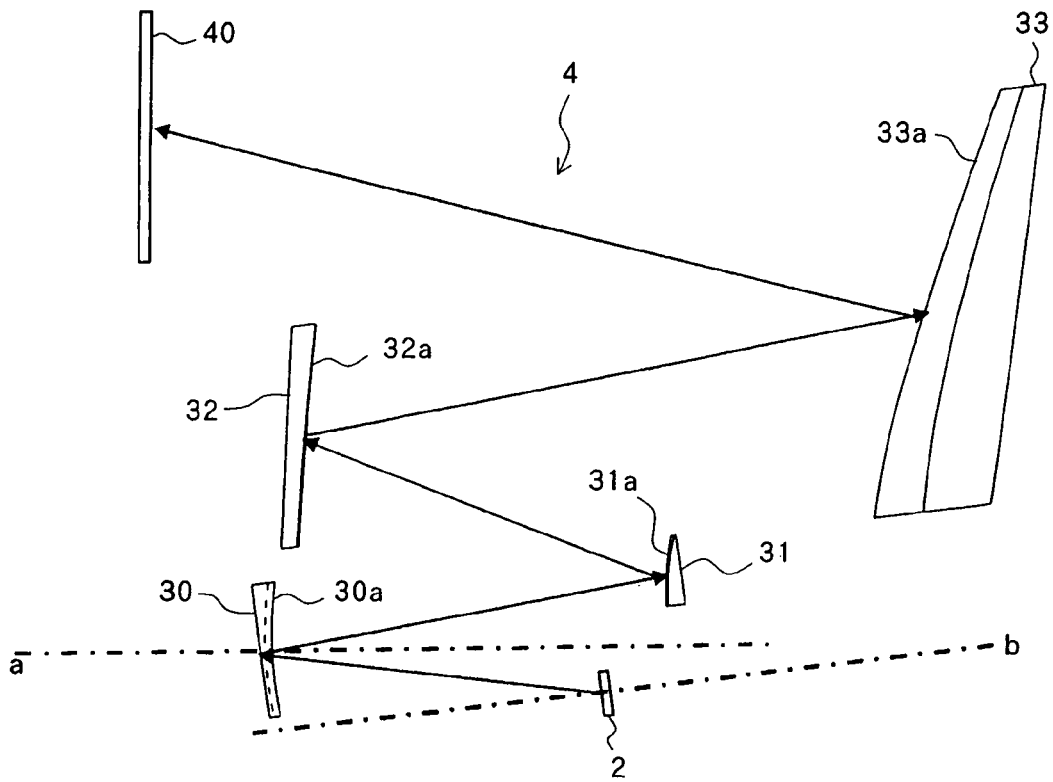
FIG. 4 is a view, taken along a YZ plane, of an image forming device and an imaging optical system shown in FIG. 3.
Figure 5:
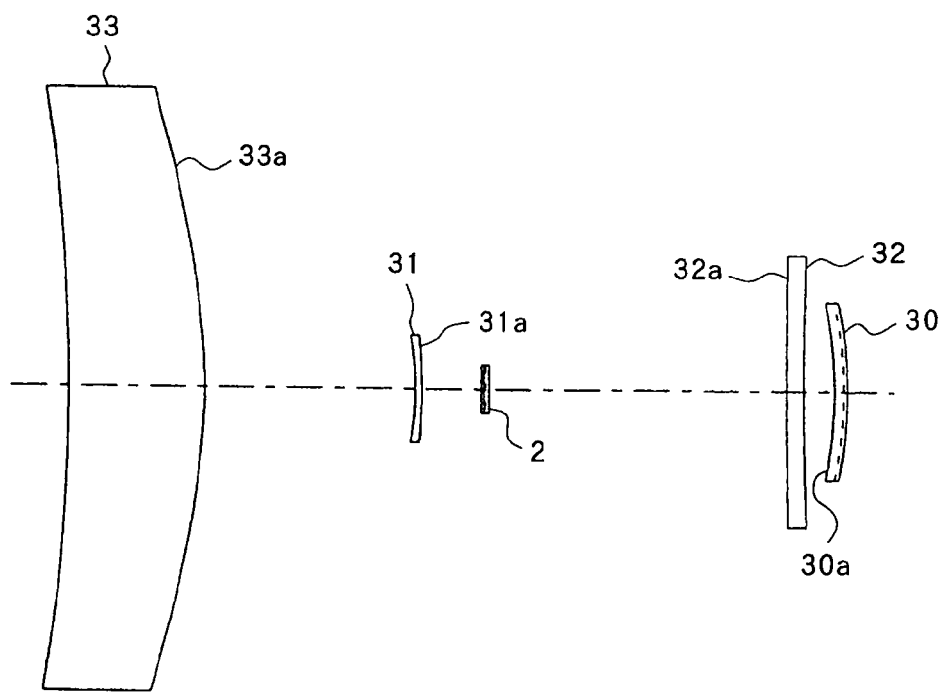
FIG. 5 is a view, as viewed in a positive direction along a Y-axis, of the image forming device and the imaging optical system shown in FIG. 3.

Imaging optical system 4 will be described in detail below. Image forming device 2 and imaging optical system 4 which are shown in FIG. 3 are illustrated at an enlarged scale in FIGS. 4 and 5 for clarifying structural details of imaging optical system 4. With respect to image forming device 2 and imaging optical system 4, a coordinate system is defined as follows: The center of image forming device 2 is used as the origin of the coordinate system. The coordinate system has a Z-axis extending on and along the sheet of FIG. 4 through the center of image forming device 2 as a straight normal line thereof. As viewed in FIG. 4, a rightward direction along the Z-axis is a positive direction, and a leftward direction a negative direction. A Y-axis extends as a straight line on and along the sheet of FIG. 4 perpendicularly to the Z-axis. As viewed in FIG. 4, an upward direction along the Y-axis is a positive direction, and a downward direction a negative direction. An X-axis extends as a straight line perpendicularly to the Y- and Z-axes and passes though the sheet of FIG. 4. A direction extending along the X-axis away from the viewer of FIG. 4 is a positive direction, and a direction extending along the X-axis toward the viewer of FIG. 4 a negative direction. FIG. 4 is a view, taken along a YZ plane, of image forming device 2 and imaging optical system 4 at an enlarged scale, and FIG. 5 is a view, as viewed in the positive direction along the Y-axis, of image forming device 2 and imaging optical system 4 at an enlarged scale.

Imaging optical system 4 comprises four reflecting mirrors, i.e., first reflecting mirror (concave mirror) 30, second reflecting mirror (convex mirror) 31, third reflecting mirror (concave mirror) 32, and fourth reflecting mirror (convex mirror) 33. These reflecting mirrors are arranged such that first reflecting mirror 30, second reflecting mirror 31, third reflecting mirror 32, and fourth reflecting mirror 33 are progressively closer to image forming device 2 in the order named. Light emitted from image forming device 2, i.e., light reflected by microscopic mirrors that are tilted +12 degrees, is applied to and reflected by reflecting surface 30a of first reflecting mirror 30. The light reflected by first reflecting mirror 30 is applied to and reflected by reflecting surface 31a of second reflecting mirror 31. The light reflected by second reflecting mirror 31 is applied to and reflected by reflecting surface 32a of third reflecting mirror 32. The light reflected by third reflecting mirror 32 is applied to and reflected by reflecting surface 33a of fourth reflecting mirror 33. Since no optical devices are present between image forming device 2 and first reflecting mirror 30, the light emitted from image forming device 2 is directly applied to reflecting surface 30a of first reflecting mirror 30. Similarly, no optical devices are present between second reflecting mirror 31 and third reflecting mirror 32 and between third reflecting mirror 32 and fourth reflecting mirror 33. Furthermore, no intermediate image is formed on the optical path from first reflecting mirror 30 to fourth reflecting mirror 33. In addition, each of reflecting surfaces 30a to 33a is of a shape that is symmetrical with respect to the YZ plane.

First reflecting mirror 30 is made of optical glass. Reflecting surface 30 of first reflecting mirror 30 is spherical in shape. Light beams emitted from image forming device 2 are not applied to the all area of the reflecting surface 30, but applied to a given reflective area thereof. Image forming device 2 is inclined with respect to first reflecting mirror 30 such that normal line "a" passing through the crest of reflecting surface 30a and normal line "b" passing through the center of image forming device 2 extend nonparallel to each other.

As described above, reflecting surface 30 of first reflecting mirror 30 is spherical in shape. If a sphere is cut along any desired plane passing through the sphere, then the cross section is necessarily circular in shape. A line of intersection between a plane (YZ plane) crossing the cross section and reflecting surface 30a is arcuate. The crest of reflecting surface 30a is positioned at the center of the arcuate line of intersection between reflecting surface 30a and the YZ plane. The normal line passing through the crest of reflecting surface 30a coincides with the axis of rotational symmetry of reflecting surface 30a, i.e., the optical axis of first reflecting mirror 30.

If image forming device 2 comprises a DMD, then the normal line of image forming device 2 refers to a normal line of a plane that approximates the reflecting surfaces of the microscopic mirrors. If a cover glass panel is disposed in front of each of the microscopic mirrors, then a normal line of the cover glass panel and a normal line of a plane approximating the reflecting surface of the microscopic mirror can be equated with each other at least according to the present invention.

Normal line "a" and normal line "b" are nonparallel to each other under the following conditions: The first condition is that image forming device 2 is inclined such that an upper side thereof is closer to first reflecting mirror 30 than a lower side thereof. The second condition is that image forming device 2 is inclined such that a lower side thereof is closer to first reflecting mirror 30 than an upper side thereof. According to the present embodiment, as shown in FIG. 4, image forming device 2 is inclined such that the upper side thereof is closer to first reflecting mirror 30 than the lower side thereof. Image forming device 2 is inclined through 5.3°.

Figure 6:
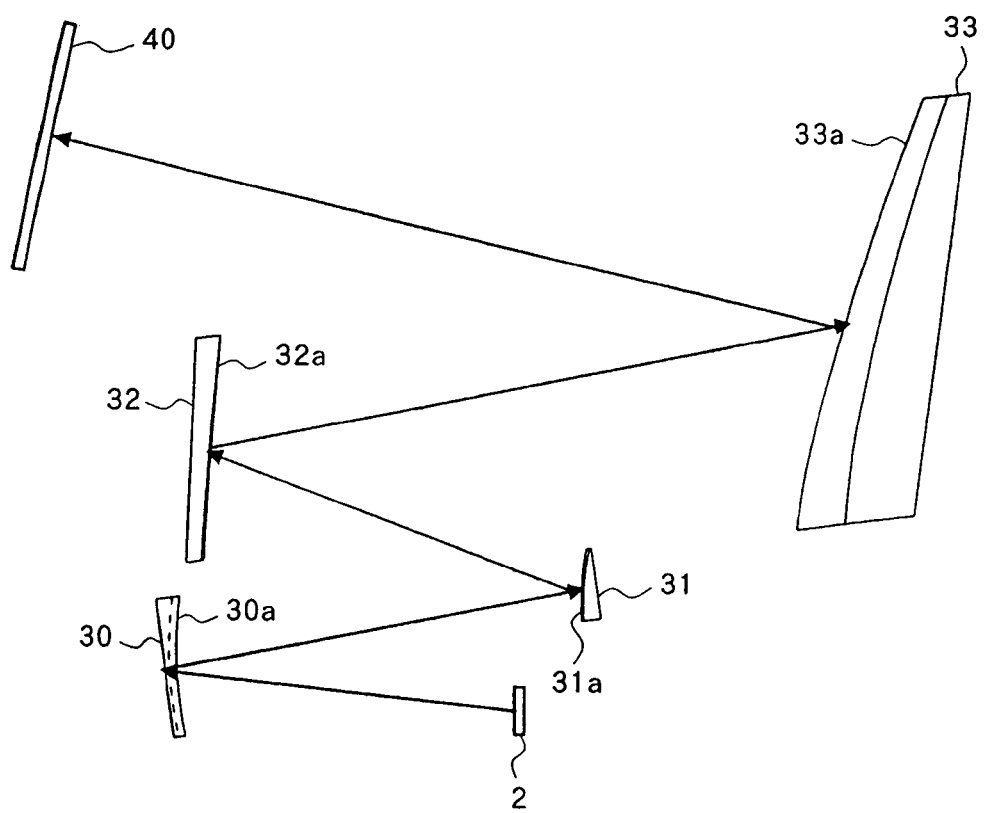
FIG. 6 is a schematic side elevational view showing an imaging surface which is inclined in a direction opposite to the image forming device that is inclined in FIG. 4.

Since first reflecting mirror 30 is a concave mirror, light beams are converged once between first reflecting mirror 30 and second reflecting mirror 31. Therefore, an image represented by the light beams is vertically inverted between first reflecting mirror 30 and second reflecting mirror 31. Stated otherwise, a light beam emitted from a position on image forming device 2 which is closer to the lower end thereof reaches a position on screen 40 which is closer to the upper end thereof. Conversely, a light beam emitted from a position on image forming device 2 which is closer to the upper end thereof reaches a position on screen 40 which is closer to the lower end thereof. With image forming device 2 being inclined as shown in FIG. 4, a lower portion of screen 40 is retracted backward (toward the left in FIG. 4), and an upper portion of the screen 40 is protruded forward (toward the right in FIG. 4) because of the vertical magnification rate. The upper portion of screen 40 protrudes forward by a distance which is represented by the square of the lateral magnification rate. The inclination of image forming device 2 as shown in FIG. 4 is equivalent to the inclination of screen (imaging surface) 40 as shown in FIG. 6. In FIG. 6, screen 40 is inclined in a direction opposite to image forming device 2 that is inclined in FIG. 4. In the conventional projection optical system which is employed in projection display apparatus, when a focused projected image that is substantially distortion-free is produced, the imaging surface (screen) and the image forming device lie parallel to each other regardless of whether the projection optical system is a reflective optical system or a refractive optical system. According to a feature of the present invention, as shown in FIG. 4, imaging surface (screen 40) and image forming device 2 lie nonparallel to each other. With imaging surface (screen 40) and image forming device 2 lying nonparallel to each other, the differences between optical path lengths of a plurality of light beams emitted from image forming device 2 are reduced, resulting in reduced aberrations. In particular, magnifying optical systems, a displacement of the imaging surface, which is caused by a displacement of image forming device 2, is affected by the magnification rate. Therefore, the differences between the optical path lengths can be greatly reduced by slightly tilting image forming device 2.

If the position of the imaging surface in an oblique projection display apparatus is lowered, then the difference between the longest optical path length and the shortest optical path length is reduced. Consequently, if the differences between the optical path lengths are reduced by inclining image forming device 2 as shown in FIG. 4 and the position of the imaging surface is lowered, then aberrations are further reduced. However, when first reflecting mirror 30 to fourth reflecting mirror 33 are laid out to lower the imaging surface while image forming device 2 is kept vertical (normal line "a" and normal line "b" shown in FIG. 4 are parallel to each other), clearances between the reflecting mirrors and the light beams are reduced, tending to cause, interference therebetween. In particular, the light beams reflected by fourth reflecting mirror 33 toward screen 40 and third reflecting mirror 32 tend to interfere with each other.

In with the projection display apparatus according to the present embodiment, however, since image forming device 2 is inclined as shown in FIG. 4, the position where the light beams emitted from image forming device 2 are applied to first reflecting mirror 30 is relatively low, i.e., lower than if image forming device 2 is kept vertical. This layout is equivalent to the imaging optical system shown in FIG. 4 which is turned counterclockwise in its entirety. Accordingly, the position of the imaging surface is lowered while maintaining desired clearances between the light beams and the reflecting mirrors. As described above, inclining image forming device 2 as shown in FIG. 4 is highly effective to lower the position of the imaging surface and then to reduce the differences between the optical path lengths.

A comparison between angles of incidence upon a screen of light beams emitted from the projection display apparatus according to the present embodiment and light beams emitted from a conventional projection display apparatus is shown in Table 1 below. The conventional projection display apparatus has almost the same structure of the projection display apparatus according to the present embodiment except that the normal line passing through the crest of the reflecting surface of the first reflecting mirror and the normal line extending to the image forming device are parallel to each other. The angles of incidence refer to angles at which light beams reflected by the fourth reflecting mirror of the inventive and conventional projection display apparatus are applied to the screen. A smaller angle of incidence means that the position of the imaging surface is lower.

TABLE 1

| | angle of incidence upon a screen | | |
|---|---|---|---|
| | low | middle | high |
| conventional projector | 34.1° | 54.9° | 64.0° |
| projector in embodiment 1 | 21.4° | 49.2° | 61.2° |

As can be seen from Table 1, the projection display apparatus according to the present embodiment is capable of projecting an image of the same size to a lower position.

In the projection display apparatus according to the present embodiment, since image forming device 2 is inclined as described above, the differences between optical path lengths of a plurality of light beams emitted from image forming device 2 are reduced, thereby reducing aberrations. Even though reflecting surface 30a of first reflecting mirror 30 is spherical, reflective optical system 4 as a whole has a sufficient aberration correcting capability. As a result, even if first reflecting mirror 30 is made of a glass material in view of heat radiated from image forming device 2, the spherical reflecting surface thereof can be manufactured to a high accuracy by a less costly polishing process.

In the projection display apparatus according to the present embodiment, furthermore, aberrations are also corrected by a combination of first reflecting mirror 30 to fourth reflecting mirror 33. As described above, since reflecting surface 30a of first reflecting mirror 30 is spherical in view of cost and accuracy, the latitude as to how first reflecting mirror 30 is to be designed from the standpoint of aberrational correction is not great. Therefore, each of second reflecting mirror 31 to fourth reflecting mirror 33 has free-form reflecting surfaces 31a to 33a that can be designed with greater latitude.

Specifically, the shape of reflecting surfaces 31a to 33a of second reflecting mirror 31 to fourth reflecting mirror 33 is expressed in the coordinate system referred to above according to the following equation:

$$Z = \frac{cr^2}{1 + \sqrt{1-(1+k)c^2r^2}} + \sum_{i=1}^{N} AiEi(x,y)$$

where $r^2 = x^2 + y^2$,
z: "sag",
k: conic constant,
c: curvature (curvature radius R=1/c),
Ai: polynomial coefficient, and
Ei: polynomial.

Table 2 shows parameters with respect to the shape and positional relationship of reflecting surfaces 30a to 33a of first reflecting mirror 30 to fourth reflecting mirror 33 at the time the projection display apparatus displays an image having a diagonal length of 60 inches. Light beams are not applied to the curved surface expressed by the above equation, but applied to only a portion thereof. If each of the reflecting mirrors has the entire curved surface expressed by the above equation as a reflecting surface thereof, then the reflecting mirrors will necessarily interfere with each other, and hence such a reflecting surface will not be practical. Actual reflecting surfaces to be used, therefore, comprise a portion of the curved surface that is expressed by the above equation. Aspherical surfaces and free-form surfaces are difficult to have a highly accurate reference point thereon unlike planar surfaces and spherical surfaces.

Reflecting surface 30a of first reflecting mirror 30 is spherical. The shape of reflecting surface 30a of first reflecting mirror 30 is expressed by an equation which is free of high-order terms that are present in the above equation. Any portion that is cut off a spherical surface remains to be a spherical surface, and a spherical surface that is cut off necessarily has a crest. It is possible to define the shape and positional relationship of the spherical surface based on the crest as a reference point. The positional relationship between image forming device 2 and first reflecting mirror 30 and the positional relationship between first reflecting mirror 30 and second reflecting mirror 31 are required to be more accurate than the positional relationship between the other reflecting mirrors because, since an image formed by image forming device 2 is progressively magnified by the reflecting mirrors, an error produced near image forming device 2 is also progressively magnified. According to the present embodiment, the positional relationship between first reflecting mirror 30 and second reflecting mirror 31 in the directions of the X-, Y-, and Z-axis is required to be far more accurate than the positional relationship between third reflecting mirror 32 and fourth reflecting mirror 33. Inasmuch as a reference point can be provided on spherical reflecting surface 30a of first reflecting surface 30, the accuracy of the positional relationship between first reflecting mirror 30 and second reflecting mirror 31 can be increased to allow the reflective optical system to have a greater aberration correcting capability than the conventional reflective optical systems.

In with the projection display apparatus according to the present embodiment, focusing adjustment is made by moving third reflecting mirror 32 shown in FIG. 4 in the direction of the Z-axis. As shown in Table 2, the radius of curvature of third reflecting mirror 32 is considerably smaller than the radii of curvature of the other reflecting mirrors. Stated otherwise, reflecting surface 32a of third reflecting mirror 32 is nearly planar. Therefore, even when third reflecting mirror 32 is moved, light beams applied to third reflecting mirror 32 are converged or diverged only to a small extent, and do not greatly affect the subsequent reflecting mirrors. Third reflecting mirror 32 is thus preferable for making focusing adjustment. The distances that third reflecting mirror 32 moves and the distances from fourth reflecting mirror 33 to screen 40 (projection distances) with respect to different image sizes are shown in Table 3. The distance that third reflecting mirror 32 moves represents the distance that third reflecting mirror 32 moves from the position where third reflecting mirror 32 is located when an image having a diagonal length of 60 inches is projected. The distance is negative (−) when third reflecting mirror 32 moves toward screen 40 and positive (+) when third reflecting mirror 32 moves away from screen 40. The projection distance represents the shortest distance from origin 0 on fourth reflecting mirror 33 to screen 40.

TABLE 2

|  |  | image forming device | 1st reflecting mirror | 2nd reflecting mirror | 3rd reflecting mirror | 4th reflecting mirror | image surface |
|---|---|---|---|---|---|---|---|
|  | c | 0 | 7.620E−03 | 2.237E−02 | −1.994E−03 | 2.639E−02 | 0 |
|  | k | 0 | 0 | 0.071 | 0 | −1.192 | 0 |
|  | $d_i$ | $d_0$ = 54.326 | $d_1$ = 75.308 | $d_2$ = 117.516 | $d_3$ = 174.644 | $d_4$ = 505.956 | — |
|  | X | 0 | 0 | 0 | 0 | 0 | 0 |
|  | Y | 0 | 117.273 | 18.541 | 17.489 | 2.284 | 0 |
|  | α | 0 | 51.125 | 0 | 0 | 0 | 6.537 |

| | $A_i$ | $E_i$ | | | $A_i$ | | |
|---|---|---|---|---|---|---|---|
| i = 1 | $A_1$ | $x^1 * y^0$ | 0 | 0 | 0 | 0 | 0 | 0 |
| | $A_2$ | $x^0 * y^1$ | 0 | 0 | 0.046 | 0.160 | −0.189 | 0 |
| | $A_3$ | $x^2 * y^0$ | 0 | 0 | −7.732E−03 | −2.929E−04 | −0.012 | 0 |
| | $A_4$ | $x^1 * y^1$ | 0 | 0 | 0 | 0 | 0 | 0 |
| | $A_5$ | $x^0 * y^2$ | 0 | 0 | −9.884E−03 | 4.063E−04 | −8.275E−03 | 0 |
| | $A_6$ | $x^3 * y^0$ | 0 | 0 | 0 | 0 | 0 | 0 |
| | $A_7$ | $x^2 * y^1$ | 0 | 0 | −7.713E−06 | 6.798E−05 | 4.959E−05 | 0 |
| | $A_8$ | $x^1 * y^2$ | 0 | 0 | 0 | 0 | 0 | 0 |
| | $A_9$ | $x^0 * y^3$ | 0 | 0 | 1.956E−04 | 2.767E−05 | 2.011E−05 | 0 |
| | $A_{10}$ | $x^4 * y^0$ | 0 | 0 | −8.333E−07 | −3.323E−09 | 2.386E−07 | 0 |
| | $A_{11}$ | $x^3 * y^1$ | 0 | 0 | 0 | 0 | 0 | 0 |
| | $A_{12}$ | $x^2 * y^2$ | 0 | 0 | −1.126E−06 | −1.804E−06 | −1.507E−07 | 0 |
| | $A_{13}$ | $x^1 * y^3$ | 0 | 0 | 0 | 0 | 0 | 0 |
| | $A_{14}$ | $x^0 * y^4$ | 0 | 0 | −9.438E−06 | −4.273E−07 | 2.883E−08 | 0 |
| | $A_{15}$ | $x^5 * y^0$ | 0 | 0 | 0 | 0 | 0 | 0 |
| | $A_{16}$ | $x^4 * y^1$ | 0 | 0 | 1.688E−08 | −1.817E−09 | −2.929E−09 | 0 |
| | $A_{17}$ | $x^3 * y^2$ | 0 | 0 | 0 | 0 | 0 | 0 |
| | $A_{18}$ | $x^2 * y^3$ | 0 | 0 | −6.768E−09 | 2.283E−08 | 1.314E−09 | 0 |
| | $A_{19}$ | $x^1 * y^4$ | 0 | 0 | 0 | 0 | 0 | 0 |
| | $A_{20}$ | $x^0 * y^5$ | 0 | 0 | 1.987E−07 | 2.951E−09 | −4.253E−10 | 0 |
| | $A_{21}$ | $x^6 * y^0$ | 0 | 0 | −2.963E−10 | 7.992E−12 | −3.880E−14 | 0 |
| | $A_{22}$ | $x^5 * y^1$ | 0 | 0 | 0 | 0 | 0 | 0 |
| | $A_{23}$ | $x^4 * y^2$ | 0 | 0 | −1.102E−09 | 4.074E−11 | 1.573E−11 | 0 |
| | $A_{24}$ | $x^3 * y^3$ | 0 | 0 | 0 | 0 | 0 | 0 |
| | $A_{25}$ | $x^2 * y^4$ | 0 | 0 | −5.176E−10 | −1.360E−10 | −1.189E−11 | 0 |
| | $A_{26}$ | $x^1 * y^5$ | 0 | 0 | 0 | 0 | 0 | 0 |
| | $A_{27}$ | $x^0 * y^6$ | 0 | 0 | −2.010E−09 | −6.700E−12 | 1.656E−12 | 0 |
| | $A_{28}$ | $x^7 * y^0$ | 0 | 0 | 0 | 0 | 0 | 0 |
| | $A_{29}$ | $x^6 * y^1$ | 0 | 0 | 0 | −5.590E−14 | 4.116E−14 | 0 |
| | $A_{30}$ | $x^5 * y^2$ | 0 | 0 | 0 | 0 | 0 | 0 |
| | $A_{31}$ | $x^4 * y^3$ | 0 | 0 | 0 | −2.050E−13 | −4.307E−14 | 0 |
| | $A_{32}$ | $x^3 * y^4$ | 0 | 0 | 0 | 0 | 0 | 0 |
| | $A_{33}$ | $x^2 * y^5$ | 0 | 0 | 0 | 3.172E−13 | 4.847E−14 | 0 |
| | $A_{34}$ | $x^1 * y^6$ | 0 | 0 | 0 | 0 | 0 | 0 |
| | $A_{35}$ | $x^0 * y^7$ | 0 | 0 | 0 | −3.033E−15 | −3.205E−15 | 0 |
| | $A_{36}$ | $x^8 * y^0$ | 0 | 0 | 0 | 0 | 2.942E−18 | 0 |
| | $A_{37}$ | $x^7 * y^1$ | 0 | 0 | 0 | 0 | 0 | 0 |
| | $A_{38}$ | $x^6 * y^2$ | 0 | 0 | 0 | 0 | −1.119E−16 | 0 |
| | $A_{39}$ | $x^5 * y^3$ | 0 | 0 | 0 | 0 | 0 | 0 |
| | $A_{40}$ | $x^4 * y^4$ | 0 | 0 | 0 | 0 | 5.085E−17 | 0 |

TABLE 2-continued

| | | | | | | | |
|---|---|---|---|---|---|---|---|
| | $A_{41}$ | x^3*y^5 | 0 | 0 | 0 | 0 | 0 | 0 |
| | $A_{42}$ | x^2*y^6 | 0 | 0 | 0 | 0 | −7.177E−17 | 0 |
| | $A_{43}$ | x^1*y^7 | 0 | 0 | 0 | 0 | 0 | 0 |
| N = 44 | $A_{44}$ | x^0*y^8 | 0 | 0 | 0 | 0 | 2.486E−18 | 0 | where c: curvature,
k: conic constant,
dj: surface-to-surface interval (distance measured between coordinate origins defining curved surfaces in a direction parallel to the Z-axis) ($d_0$: interval between the image forming device and the first reflecting mirror, $d_1$: interval between the first reflecting mirror and the second reflecting mirror, $d_2$: interval between the second reflecting mirror and the third reflecting mirror, $d_3$: interval between the third reflecting mirror and the fourth reflecting mirror, $d_4$: interval between the fourth reflecting mirror and the imaging surface),
X: distance measured from the Z-axis to coordinate origins that defines curved surfaces in the direction of the X-axis,
Y: distance measured from the Z-axis to coordinate origins that defines curved surfaces in the direction of the Y-axis,
α: angle of rotation of the YZ plane about the X-axis, and
Ai: coefficient of Ei of the polynomial.

TABLE 3

| | image size[inch] | | | |
|---|---|---|---|---|
| | 40 | 60 | 80 | 100 |
| moving distance[mm] | −5.325 | 0.000 | 2.649 | 4.139 |
| projection distance[mm] | 301.364 | 505.956 | 709.407 | 912.251 |

Figure 7A:
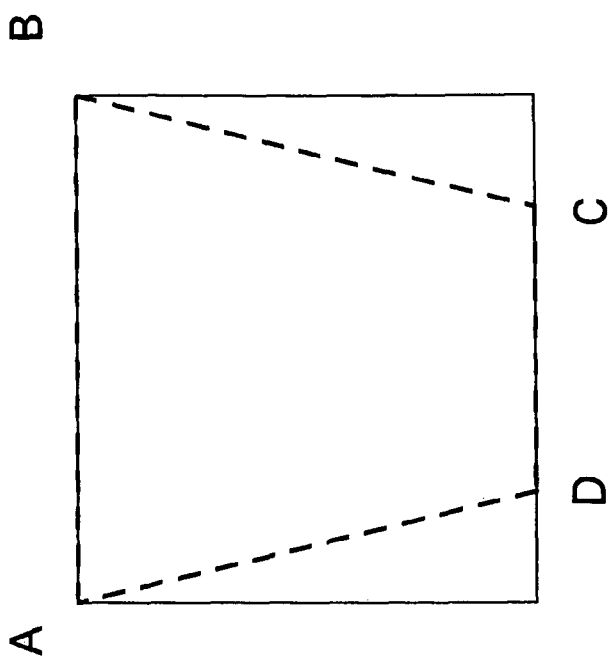
FIGS. 7A through 7J are diagrams illustrative of types of distorted images and processes of calculating an amount of distortion.
Figure 7B:
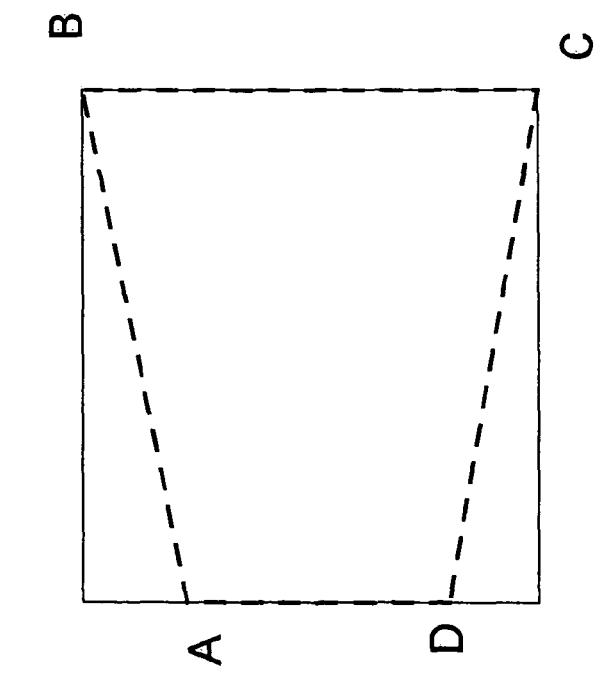
Figure 7C:
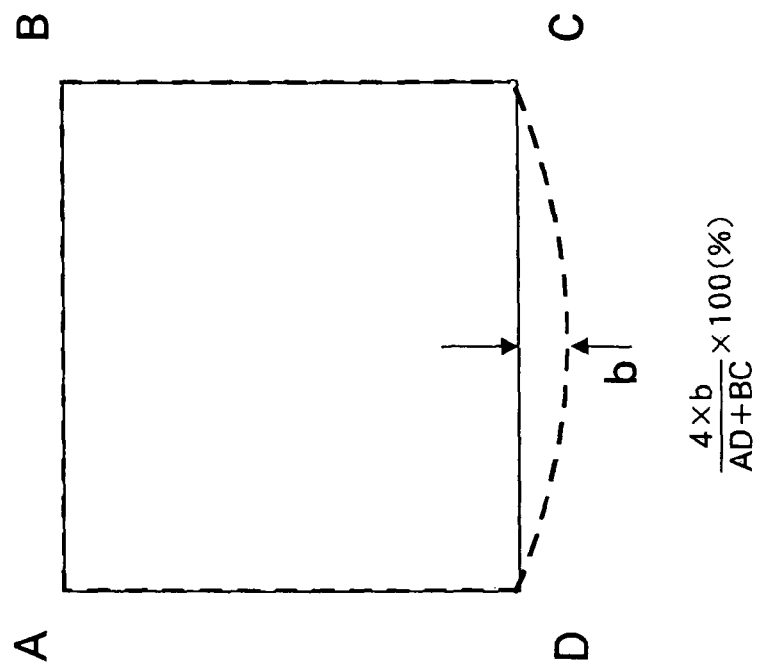
Figure 7D:
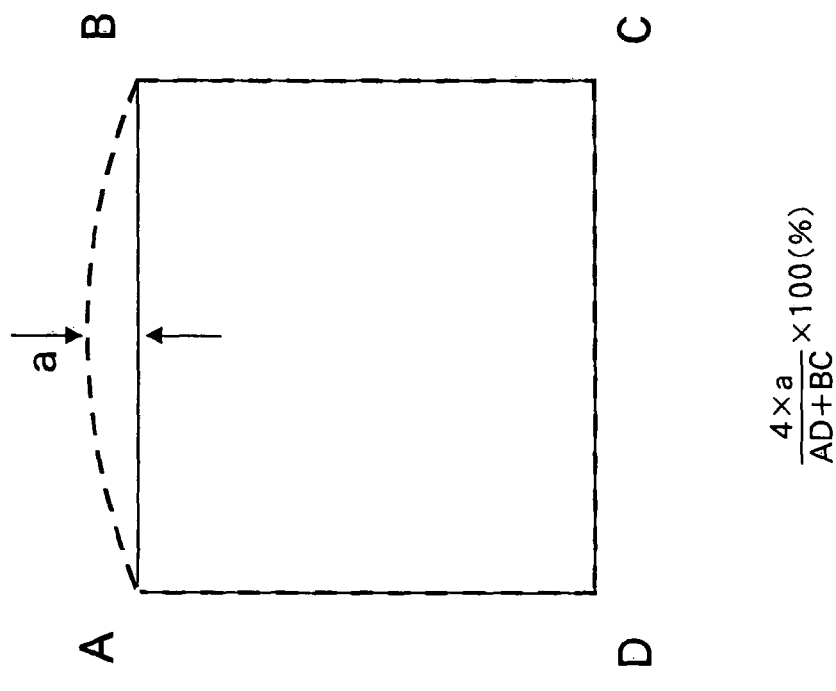
Figure 7F:
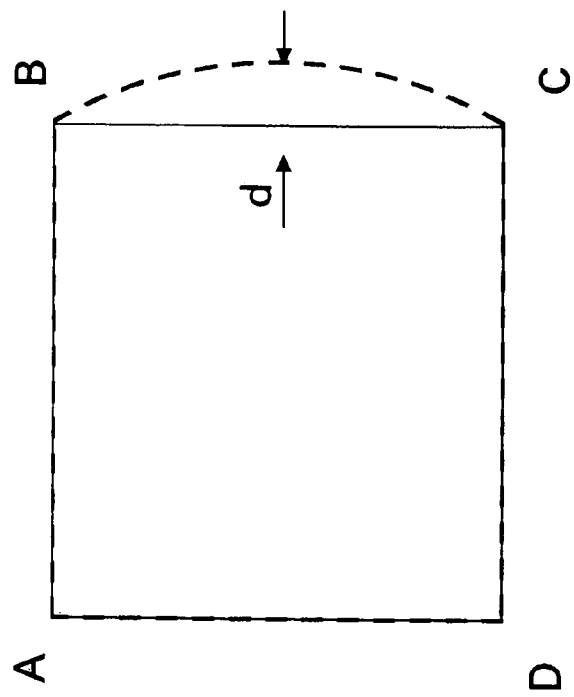
Figure 7E:
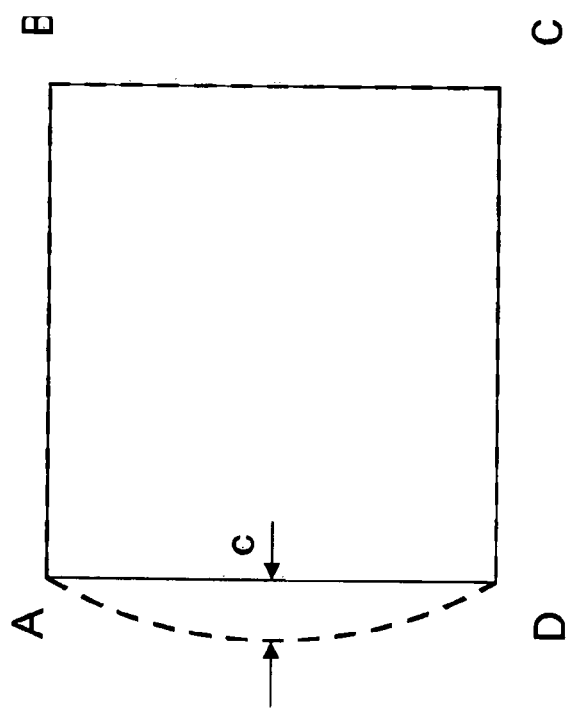
Figure 7G:
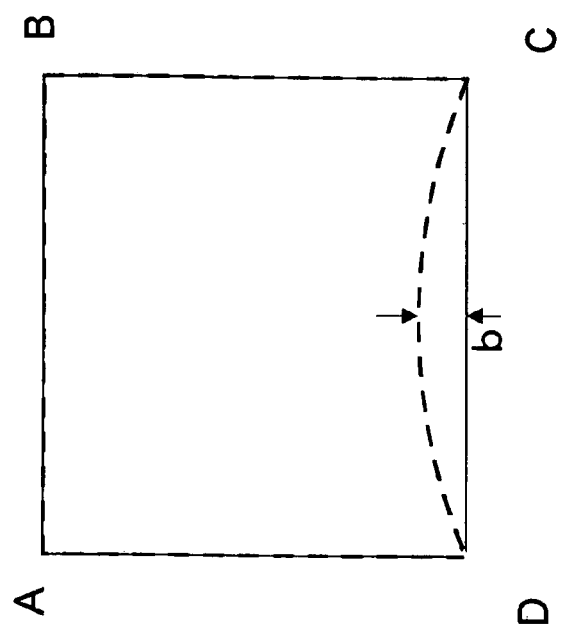
Figure 7H:
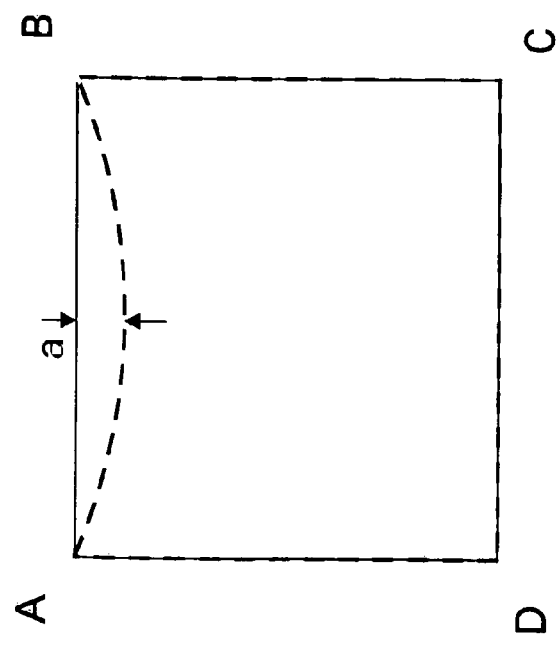
Figure 7J:
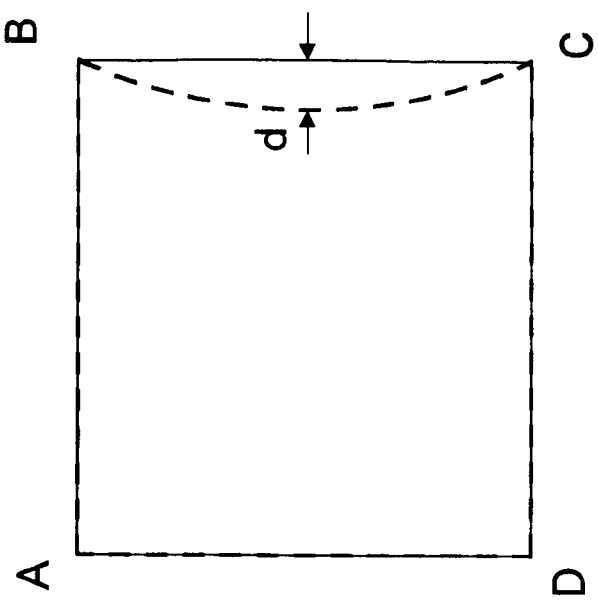
Figure 7I:
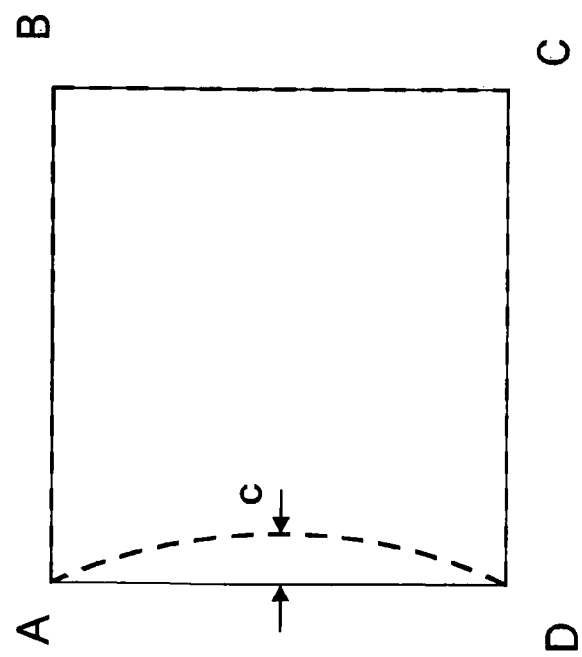

Types of distortions that can be generated when images are projected by the projection display apparatus according to the present embodiment are shown in FIGS. 7A through 7J. In each of FIGS. 7A through 7J, the solid lines represent an ideal image free of distortions, and the dotted lines represent a distorted image. FIG. 7A shows a horizontal trapezoidal distortion of an image which has left and right sides having different lengths. FIG. 7B shows a vertical trapezoidal distortion of an image which has upper and lower sides having different lengths. FIGS. 7C through 7F shows variations of a barrel distortion of an image which has at least one side curved outwardly. FIGS. 7G through 7J show variations of a pincushion distortion of an image which has at least one side curved inwardly.

The amounts of distortion of the distorted images shown in FIGS. 7A through 7J with respect to different image sizes are shown in Table 4. The amounts of distortion shown in Table 4 are calculated values, rather than measured values. The amounts of distortion were calculated by processes shown respectively in FIGS. 7A through 7J.

TABLE 4

| | | 40 inch | 60 inch | 80 inch | 100 inch |
|---|---|---|---|---|---|
| Trapezoidal distortion | Horizontal | 0.00% | 0.00% | 0.00% | 0.00% |
| | Vertical | 0.40% | 0.02% | −0.11% | −0.21% |
| Barrel distortion | Top | 0.26% | 0.09% | — | — |
| | Bottom | 0.69% | 0.38% | 0.25% | — |
| | Left | 0.47% | 0.10% | 0.15% | 0.25% |
| | Right | 0.47% | 0.10% | 0.15% | 0.25% |

TABLE 4-continued

| | | 40 inch | 60 inch | 80 inch | 100 inch |
|---|---|---|---|---|---|
| Pincushion distortion | Top | — | — | −0.10% | −0.12% |
| | Bottom | — | — | — | −0.24% |
| | Left | — | — | — | — |
| | Right | — | — | — | — |

2nd Embodiment

Figure 8:
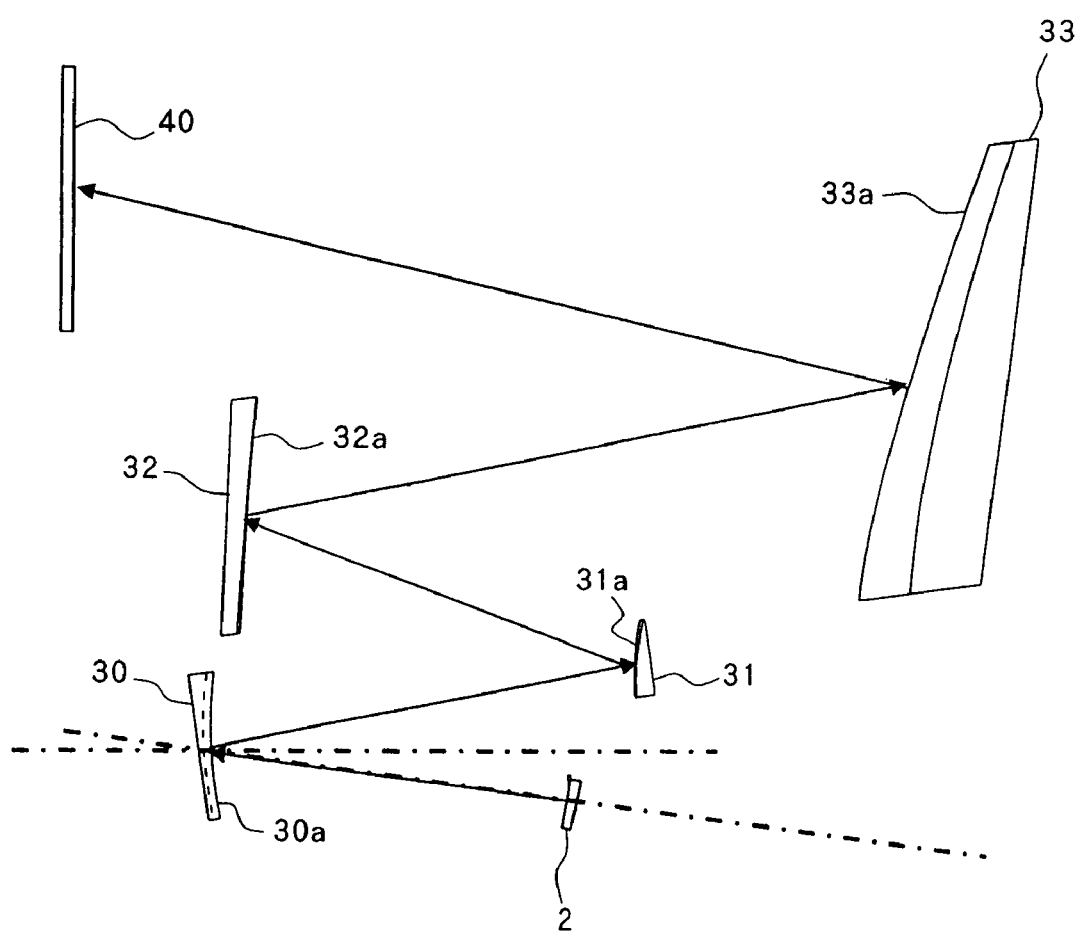
FIG. 8 is a schematic perspective view of an internal structure of a projection display apparatus according to a second embodiment of the present invention.

FIG. 8 shows a projection display apparatus according to a second embodiment of the present invention. The projection display apparatus according to the second embodiment has a basic structure which is the same as the projection display apparatus according to the first embodiment. Those parts of the projection display apparatus according to the second embodiment which are identical to those of the projection display apparatus according to the first embodiment are denoted by identical reference characters in FIG. 8, and will not be described in detail below.

The projection display apparatus according to the second embodiment differs from the projection display apparatus according to the first embodiment only as to the direction in which image forming device 2 is inclined. Specifically, as shown in FIG. 8, image forming device 2 is inclined such that a lower side thereof is closer to first reflecting mirror 30 than an upper side thereof. According to the first embodiment, as described above, image forming device 2 is inclined such that an upper side thereof is closer to first reflecting mirror 30 than a lower side thereof.

The operation and advantages of image forming device 2 which is inclined as shown in FIG. 4 according to the first embodiment have been described in detail above. The projection display apparatus according to the first embodiment is better than the projection display apparatus according to the second embodiment for reducing aberrations by reducing the differences between optical path lengths. According to the second embodiment, the angle of incidence upon first reflecting mirror 30 of light beams emitted from image forming device 2 is increased by inclining image forming device 2 as shown in FIG. 8. As a result, the clearances between the light beams reflected by second reflecting mirror 31 to fourth reflecting mirror 33 and second reflecting mirror 31 to fourth reflecting mirror 33 are increased.

The projection display apparatus according to the second embodiment is advantageous in that it can lower the position of the imaging surface and it can provide sufficient clearances between the light beams and the reflecting mirrors. When image forming device 2 is inclined as shown in FIG. 8, the differences between optical path lengths become larger than those in the projection display apparatus according to the first embodiment. However, the amount of increase from the differences between optical path lengths in the projection display apparatus according to the first embodiment can be sufficiently absorbed by second reflecting mirror 31 to fourth reflecting mirror 33, particularly third and fourth reflecting mirrors 32, 33, which have free-form reflecting surfaces that can be designed with great latitude. The projection display apparatus according to the second embodiment has, as a whole, an aberration correcting function that is equivalent to aberration correcting function of the projection display apparatus according to the first embodiment.

A comparison between angles of incidence upon a screen of light beams emitted from the projection display apparatus according to the second embodiment and light beams emitted from a conventional projection display apparatus is shown in Table 5 below. The conventional projection display apparatus has almost the same structure of the projection display apparatus according to the second embodiment except that the normal line passing through the crest of the reflecting surface of the first reflecting mirror and the normal line extending to the image forming device are parallel to each other. The angles of incidence refer to angles at which light beams reflected by the fourth reflecting mirror of the inventive and conventional projection display apparatus are applied to the screen. A smaller angle of incidence means that the position of the imaging surface is lower.

TABLE 5

| | angle of incidence upon a screen | | |
|---|---|---|---|
| | low | middle | high |
| conventional projector | 34.1° | 54.9° | 64.0° |
| projector in embodiment 2 | 24.2° | 49.6° | 61.1° |

Table 6 shows parameters with respect to the shape and positional relationship of reflecting surfaces $30a$ to $33a$ of first reflecting mirror 30 to fourth reflecting mirror 33 at the time the projection display apparatus displays an image having a diagonal length of 60 inches.

TABLE 6

| | | image forming device | 1st reflecting mirror | 2nd reflecting mirror | 3rd reflecting mirror | 4th reflecting mirror | imaging surface |
|---|---|---|---|---|---|---|---|
| | c | 0 | 7.686E−03 | 2.200E−02 | −3.036E−03 | 8.956E−03 | 0 |
| | k | 0 | 0 | 0.110 | 0 | −4.658 | 0 |
| | $d_i$ | $d_0 = 53.355$ | $d_1 = 73.350$ | $d_2 = 93.240$ | $d_3 = 170.459$ | $d_4 = 532.551$ | — |
| | X | 0 | 0 | 0 | 0 | 0 | 0 |
| | Y | 0 | 116.711 | 18.656 | 16.488 | 51.371 | 0 |
| | α | 0 | 51.404 | 0 | 0 | 0 | −6.821 |

| | $A_i$ | $E_i$ | | | $A_i$ | | |
|---|---|---|---|---|---|---|---|
| i = 1 | $A_1$ | $x\hat{\ }1*y\hat{\ }0$ | 0 | 0 | 0 | 0 | 0 | 0 |
| | $A_2$ | $x\hat{\ }0*y\hat{\ }1$ | 0 | 0 | 0.0437 | 0.038 | −0.153 | 0 |
| | $A_3$ | $x\hat{\ }2*y\hat{\ }0$ | 0 | 0 | −7.443E−03 | 9.734E−04 | −5.82E−05 | 0 |
| | $A_4$ | $x\hat{\ }1*y\hat{\ }1$ | 0 | 0 | 0 | 0 | 0 | 0 |
| | $A_5$ | $x\hat{\ }0*y\hat{\ }2$ | 0 | 0 | −9.478E−03 | 1.164E−03 | −3.530E−05 | 0 |
| | $A_6$ | $x\hat{\ }3*y\hat{\ }0$ | 0 | 0 | 0 | 0 | 0 | 0 |
| | $A_7$ | $x\hat{\ }2*y\hat{\ }1$ | 0 | 0 | −1.175E−06 | 5.728E−05 | 2.529E−06 | 0 |
| | $A_8$ | $x\hat{\ }1*y\hat{\ }2$ | 0 | 0 | 0 | 0 | 0 | 0 |
| | $A_9$ | $x\hat{\ }0*y\hat{\ }3$ | 0 | 0 | 1.932E−04 | 2.836E−05 | −1.725E−06 | 0 |
| | $A_{10}$ | $x\hat{\ }4*y\hat{\ }0$ | 0 | 0 | −8.620E−07 | −1.153E−08 | 2.442E−08 | 0 |
| | $A_{11}$ | $x\hat{\ }3*y\hat{\ }1$ | 0 | 0 | 0 | 0 | 0 | 0 |
| | $A_{12}$ | $x\hat{\ }2*y\hat{\ }2$ | 0 | 0 | −1.575E−06 | −1.674E−06 | −2.681E−08 | 0 |
| | $A_{13}$ | $x\hat{\ }1*y\hat{\ }3$ | 0 | 0 | 0 | 0 | 0 | 0 |
| | $A_{14}$ | $x\hat{\ }0*y\hat{\ }4$ | 0 | 0 | −9.487E−06 | −4.426E−07 | 1.493E−09 | 0 |
| | $A_{15}$ | $x\hat{\ }5*y\hat{\ }0$ | 0 | 0 | 0 | 0 | 0 | 0 |
| | $A_{16}$ | $x\hat{\ }4*y\hat{\ }1$ | 0 | 0 | 1.306E−08 | −2.929E−09 | −3.129E−10 | 0 |
| | $A_{17}$ | $x\hat{\ }3*y\hat{\ }2$ | 0 | 0 | 0 | 0 | 0 | 0 |
| | $A_{18}$ | $x\hat{\ }2*y\hat{\ }3$ | 0 | 0 | 2.128E−09 | 2.214E−08 | 1.781E−10 | 0 |
| | $A_{19}$ | $x\hat{\ }1*y\hat{\ }4$ | 0 | 0 | 0 | 0 | 0 | 0 |
| | $A_{20}$ | $x\hat{\ }0*y\hat{\ }5$ | 0 | 0 | 2.018E−07 | 2.991E−09 | 1.767E−11 | 0 |
| | $A_{21}$ | $x\hat{\ }6*y\hat{\ }0$ | 0 | 0 | −2.382E−10 | 6.741E−12 | −2.182E−12 | 0 |
| | $A_{22}$ | $x\hat{\ }5*y\hat{\ }1$ | 0 | 0 | 0 | 0 | 0 | 0 |
| | $A_{23}$ | $x\hat{\ }4*y\hat{\ }2$ | 0 | 0 | −7.749E−10 | 6.979E−11 | 5.018E−13 | 0 |
| | $A_{24}$ | $x\hat{\ }3*y\hat{\ }3$ | 0 | 0 | 0 | 0 | 0 | 0 |
| | $A_{25}$ | $x\hat{\ }2*y\hat{\ }4$ | 0 | 0 | −4.292E−10 | −1.371E−10 | −1.982E−13 | 0 |
| | $A_{26}$ | $x\hat{\ }1*y\hat{\ }5$ | 0 | 0 | 0 | 0 | 0 | 0 |
| | $A_{27}$ | $x\hat{\ }0*y\hat{\ }6$ | 0 | 0 | −2.007E−09 | −5.463E−12 | −2.228E−14 | 0 |
| | $A_{28}$ | $x\hat{\ }7*y\hat{\ }0$ | 0 | 0 | 0 | 0 | 0 | 0 |
| | $A_{29}$ | $x\hat{\ }6*y\hat{\ }1$ | 0 | 0 | 0 | −3.746E−14 | 2.492E−14 | 0 |
| | $A_{30}$ | $x\hat{\ }5*y\hat{\ }2$ | 0 | 0 | 0 | 0 | 0 | 0 |
| | $A_{31}$ | $x\hat{\ }4*y\hat{\ }3$ | 0 | 0 | 0 | −3.740E−13 | 1.139E−14 | 0 |
| | $A_{32}$ | $x\hat{\ }3*y\hat{\ }4$ | 0 | 0 | 0 | 0 | 0 | 0 |
| | $A_{33}$ | $x\hat{\ }2*y\hat{\ }5$ | 0 | 0 | 0 | 3.377E−13 | −4.329E−15 | 0 |
| | $A_{34}$ | $x\hat{\ }1*y\hat{\ }6$ | 0 | 0 | 0 | 0 | 0 | 0 |
| | $A_{35}$ | $x\hat{\ }0*y\hat{\ }7$ | 0 | 0 | 0 | −1.049E−14 | 3.729E−16 | 0 |
| | $A_{36}$ | $x\hat{\ }8*y\hat{\ }0$ | 0 | 0 | 0 | 0 | 1.897E−17 | 0 |
| | $A_{37}$ | $x\hat{\ }7*y\hat{\ }1$ | 0 | 0 | 0 | 0 | 0 | 0 |
| | $A_{38}$ | $x\hat{\ }6*y\hat{\ }2$ | 0 | 0 | 0 | 0 | −7.078E−17 | 0 |
| | $A_{39}$ | $x\hat{\ }5*y\hat{\ }3$ | 0 | 0 | 0 | 0 | 0 | 0 |
| | $A_{40}$ | $x\hat{\ }4*y\hat{\ }4$ | 0 | 0 | 0 | 0 | −4.961E−17 | 0 |
| | $A_{41}$ | $x\hat{\ }3*y\hat{\ }5$ | 0 | 0 | 0 | 0 | 0 | 0 |

TABLE 6-continued

|   |     |        |   |   |   |   |            |   |
|---|-----|--------|---|---|---|---|------------|---|
|   | A_42 | x^2*y^6 | 0 | 0 | 0 | 0 | 1.771E−17 | 0 |
|   | A_43 | x^1*y^7 | 0 | 0 | 0 | 0 | 0 | 0 |
| N = 44 | A_44 | x^0*y^8 | 0 | 0 | 0 | 0 | −1.773E−18 | 0 |

In with the projection display apparatus according to the second embodiment, focusing adjustment is also made by moving third reflecting mirror 32 in the direction of the optical axis (the Z-axis). The distances that third reflecting mirror 32 moves and the distances from fourth reflecting mirror 33 to screen 40 (projection distances) with respect to different image sizes are shown in Table 7.

TABLE 7

| | image size[inch] | | | |
|---|---|---|---|---|
| | 40 | 60 | 80 | 100 |
| moving distance[mm] | −5.287 | 0.000 | 2.531 | 3.970 |
| projection distance[mm] | 320.406 | 532.551 | 743.438 | 953.646 |

Table 8 shows the amounts of distortion that can be generated when images are projected by the projection display apparatus according to the second embodiment. Distorted images have the same shapes as those shown in FIGS. 7A through 7J, and the amounts of distortion were calculated by the processes shown respectively in FIGS. 7A through 7J.

TABLE 8

| | | 40 inch | 60 inch | 80 inch | 100 inch |
|---|---|---|---|---|---|
| Trapezoidal distortion | Horizontal | 0.00% | 0.00% | 0.00% | 0.00% |
| | Vertical | 0.38% | 0.05% | −0.09% | −0.18% |
| Barrel distortion | Top | 0.29% | 0.02% | — | — |
| | Bottom | 0.15% | — | — | — |
| | Left | 0.37% | 0.08% | 0.03% | 0.10% |
| | Right | 0.37% | 0.08% | 0.03% | 0.10% |
| Pincushion distortion | Top | — | — | −0.16% | −0.19% |
| | Bottom | — | −0.13% | −0.16% | −0.20% |
| | Left | — | — | — | — |
| | Right | — | — | — | — |

The embodiments of the present invention have been described above with respect to a projection display apparatus where the image forming device comprises a DMD. However, the image forming device of the projection display apparatus according to the present invention is not limited to a DMD, but may be a transmissive liquid crystal panel or a reflective liquid crystal panel. The projection display apparatus may have a plurality of image forming devices, rather than a single image forming device.

While preferred embodiments of the present invention have been described using specific terms, such description is for illustrative purposes only, and it is to be understood that changes and variations may be made without departing from the spirit or scope of the following claims.

What is claimed is:

1. A projection display apparatus comprising:
   a light source;
   an image forming device for modulating light emitted from said light source with an image signal supplied thereto; and
   a reflective optical system for magnifying and projecting an image generated by said image forming device, said reflective optical system comprising:
   a first reflecting mirror for reflecting light emitted from said image forming device and initially applied thereto; and
   a plurality of reflecting mirrors for successively reflecting the light reflected by said first reflecting mirror,
   wherein said first reflecting mirror has a spherical reflecting surface, and said image forming device is inclined with respect to the first reflecting mirror such that a distance between the first reflecting mirror and an upper side of the image forming device is less than a distance between the first reflecting mirror and the lower side of the image forming device, and such that a normal line passing through the crest of said spherical reflecting surface and a normal line passing through said image forming device extend nonparallel to each other.

2. A projection display apparatus according to claim 1, wherein said reflecting mirrors, other than said first reflecting mirror, of said reflective optical system have free-form reflecting surfaces, respectively.

3. A projection display apparatus according to claim 1, wherein said plurality of reflecting mirrors include a second reflecting mirror for reflecting the light reflected by said first reflecting mirror, a third reflecting mirror for reflecting the light reflected by said second reflecting mirror, and a fourth reflecting mirror for reflecting the light reflected by said third reflecting mirror, said reflecting surface of said first reflecting mirror comprising a concave surface, and said second reflecting mirror, said third reflecting mirror, and said fourth reflecting mirror have convex reflecting surfaces, respectively.

4. A projection display apparatus according to claim 1, wherein said image forming device comprises a digital micromirror device (DMD) comprising a plurality of tiltable microscopic mirrors.

5. A projection display apparatus according to claim 4, wherein said normal line passing through said image forming device comprises a normal line of a plane that approximates a reflecting surface of said microscopic mirrors.

6. A projection display apparatus according to claim 3, wherein said light reflected by said fourth reflecting mirror is reflected onto an imaging surface.

7. A projection display apparatus according to claim 6, wherein an inclination of said image forming device is equal to an inclination of said imaging surface.

8. A projection display apparatus according to claim 3, wherein said imaging surface and said image forming device are nonparallel.

9. A projection display apparatus according to claim 1, further comprising:
   an illumination optical system which guides light from said light source toward said image forming device.

10. A projection display apparatus according to claim 3, wherein light beams are converged once between said first reflecting mirror and said second reflecting mirror, such that an image represented by said light beams is vertically inverted between said first and second reflecting mirrors.

11. A projection display apparatus according to claim 9, wherein said illumination optical system comprises:

a color wheel for separating light from said light source;
a rod lens which makes uniform a luminance distribution of light that has passed through said color wheel; and
a relay optical system for changing an optical path of light tat has passed through said rod lens, and guiding said light toward said image forming device.

12. A projection display apparatus comprising:
a light source;
an image forming device for modulating light emitted from said light source with an image signal supplied thereto; and
a reflective optical system for magnifying and projecting an image generated by said image forming device, said reflective optical system comprising:
   a first reflecting mirror for reflecting light emitted from said image forming device and initially applied thereto; and
   a plurality of reflecting mirrors for successively reflecting the light reflected by said first reflecting mirror,
wherein said first reflecting mirror has a spherical reflecting surface, and said image forming device is inclined with respect to the first reflecting mirror such that a distance between the first reflecting mirror and an upper side of the image forming device is less than a distance between the first reflecting mirror and the lower side of the image forming device, and such that a normal line passing through the crest of said spherical reflecting surface coincides with the optical axis of said first reflecting mirror and extends nonparallel to a normal line passing through said image forming device.

13. A projection display apparatus according to claim 12, wherein said reflecting mirrors, other than said first reflecting mirror, of said reflective optical system have free-form reflecting surfaces, respectively.

14. A projection display apparatus according to claim 12, wherein said plurality of reflecting mirrors include a second reflecting mirror for reflecting the light reflected by said first reflecting mirror, a third reflecting mirror for reflecting the light reflected by said second reflecting mirror, and a fourth reflecting mirror for reflecting the light reflected by said third reflecting mirror, said reflecting surface of said first reflecting mirror comprising a concave surface, and said second reflecting mirror, said third reflecting minor, and said fourth reflecting mirror have convex reflecting surfaces, respectively.

15. A projection display apparatus comprising:
a light source;
an image forming device for modulating light emitted from said light source with an image signal supplied thereto; and
a reflective optical system for magnifying and projecting an image generated by said image forming device, said reflective optical system comprising:
   a first reflecting mirror for reflecting light emitted from said image forming device and initially applied thereto; and
   a second reflecting mirror, a third reflecting mirror, and a fourth reflecting mirror for successively reflecting the light reflected by said first reflecting mirror,
wherein said first reflecting mirror has a spherical concave reflecting surface, said second reflecting mirror, said third reflecting mirror, and said fourth reflecting mirror have convex reflecting surfaces, respectively,
wherein said image forming device is inclined with respect to the first reflecting mirror such that a distance between the first reflecting mirror and an upper side of the image forming device is less than a distance between the first reflecting mirror and the lower side of the image forming device, and such that a normal line passing through the crest of said spherical concave reflecting surface of said first reflecting mirror and a normal line passing through said image forming device extend nonparallel to each other, and
wherein the convex reflecting surface of said third reflecting minor has the smallest curvature among the reflecting surfaces of the first through fourth reflecting mirrors.

16. A projection display apparatus comprising:
a light source;
an image forming device for modulating light emitted from said light source with an image signal supplied thereto; and
a reflective optical system for magnifying and projecting an image generated by said image forming device, said reflective optical system comprising:
   a first reflecting mirror for reflecting light emitted from said image forming device and initially applied thereto; and
   a second reflecting mirror, a third reflecting mirror, and a fourth reflecting mirror for successively reflecting the light reflected by said first reflecting mirror;
wherein said first reflecting mirror has a spherical concave reflecting surface, said second reflecting mirror, said third reflecting mirror, and said fourth reflecting mirror have convex reflecting surfaces, respectively,
wherein said image forming device is inclined with respect to the first reflecting mirror such that a distance between the first reflecting mirror and an upper side of the image forming device is less than a distance between the first reflecting mirror and the lower side of the image forming device, and such that a normal line passing through the crest of said spherical concave reflecting surface of said first reflecting mirror coincides with the optical axis of said first reflecting mirror and extends nonparallel to a normal line passing through said image forming device, and
wherein the convex reflecting surface of said third reflecting mirror has the smallest curvature among the reflecting surfaces of the first through fourth reflecting mirrors.

* * * * *